(12) United States Patent
Mohan

(10) Patent No.: US 11,231,712 B2
(45) Date of Patent: Jan. 25, 2022

(54) DIGITAL MODEL RECTIFICATION WITH SENSING ROBOT

(71) Applicant: Ford Global Technologies, LLC, Dearborn, MI (US)

(72) Inventor: Shankar Narayan Mohan, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 148 days.

(21) Appl. No.: 16/439,151

(22) Filed: Jun. 12, 2019

(65) Prior Publication Data

US 2020/0393833 A1    Dec. 17, 2020

(51) Int. Cl.
  *G05D 1/00*   (2006.01)
  *G05D 1/02*   (2020.01)
(52) U.S. Cl.
  CPC ......... *G05D 1/0094* (2013.01); *G05D 1/0219* (2013.01); *G05D 1/0274* (2013.01)
(58) Field of Classification Search
  CPC ... G05D 1/0094; G05D 1/0274; G05D 1/0219
  See application file for complete search history.

(56) References Cited

U.S. PATENT DOCUMENTS

| | | | | |
|---|---|---|---|---|
| 5,202,661 A * | 4/1993 | Everett, Jr. | ............ | G08B 13/00 340/522 |
| 6,108,597 A | 8/2000 | Kirchner et al. | | |
| 9,298,183 B2 | 3/2016 | Artes et al. | | |
| 9,797,732 B2 | 10/2017 | Li et al. | | |
| 9,939,814 B1 | 4/2018 | Bauer et al. | | |
| 10,330,480 B1 * | 6/2019 | Krishnaswamy | .... | G05D 1/0274 |
| 11,003,179 B2 | 5/2021 | Cella et al. | | |
| 2004/0239756 A1 * | 12/2004 | Aliaga | ............ | G08B 13/19643 348/36 |
| 2006/0235610 A1 * | 10/2006 | Ariyur | ................. | G05D 1/0274 701/533 |
| 2011/0153338 A1 | 6/2011 | Anderson | | |
| 2011/0167574 A1 | 7/2011 | Stout et al. | | |
| 2012/0197439 A1 | 8/2012 | Wang et al. | | |

(Continued)

OTHER PUBLICATIONS

Wang, You-Chiun, et al; "Efficient Deployment Algorithms for Ensuring Coverage and Connectivity of Wireless Sensor Networks"; 2005; Department of Computer Science and Information Engineering; National Chiao Tung University; Taiwan (Year: 2005).*

(Continued)

*Primary Examiner* — Peter D Nolan
*Assistant Examiner* — Kenneth M Dunne
(74) *Attorney, Agent, or Firm* — Frank A. MacKenzie; Bejin Bieneman PLC

(57) ABSTRACT

A system includes a computer that includes a processor and a memory storing instructions executable by the processor to decompose a stored map of an area into a plurality of polygonal sub-areas. The instructions include instructions to generate a set of target locations in the polygonal sub-areas according to a leaky ball algorithm. The instructions include instructions to actuate a robot to move to a first one of the target locations of the set. The instructions include instructions to actuate a sensor to collect data at the first one of the target locations.

15 Claims, 9 Drawing Sheets

(56) References Cited

U.S. PATENT DOCUMENTS

| | | | |
|---|---|---|---|
| 2012/0221237 A1* | 8/2012 | Jung | G05D 1/0274 |
| | | | 701/400 |
| 2013/0325244 A1 | 12/2013 | Wang et al. | |
| 2014/0316636 A1 | 10/2014 | Hong et al. | |
| 2017/0225336 A1* | 8/2017 | Deyle | G08B 13/196 |
| 2018/0299899 A1 | 10/2018 | Suvarna et al. | |
| 2018/0306589 A1 | 10/2018 | Holz | |
| 2018/0364045 A1 | 12/2018 | Williams et al. | |
| 2019/0329407 A1 | 10/2019 | Qi et al. | |
| 2019/0354106 A1* | 11/2019 | Gupta | G05D 1/0219 |
| 2020/0393833 A1 | 12/2020 | Mohan | |

OTHER PUBLICATIONS

Mesa-Barrameda, et al; "Sensor Deployment by a Robot in an Unknown Orthogonal Region: Achieving Full Coverage"; 2013; School of Computer Science Carlton University; Canada (Year: 2013).*

Gonzalez-Banos, "A Randomized Art-Gallery Algorithm for Sensor Placement", Jun. 2001, Stanford University, (Year: 2001).*

Joseph O'Rourke, "Art Gallery Theorems and Algorithm", 1987, Oxford University Press. (Year: 1987).*

"Drones and 3-D Mapping", https://www.dronesetc.com/blogs/news/drones-and-3-d-mapping (downloaded Mar. 9, 2019).

Wang et al., "Efficient Deployment Algorithms for Ensuring Coverage and Connectivity of Wireless Sensor Networks", Deparlment of Computer Science and Information Engineering; National Chiao Tung University, Hsin-Chu, 30050, Taiwan, May 2, 2005.

Mesa-Barrameda et al., "Sensor Deployment by a Robot in an Unknown Orthogonal Region: Achieving Full Coverage", School of Computer Science Carleton University, Canada; Faculty of Business and Information TechnologyU niversity of Ontario Institute of Technology, Canada, Dec. 16, 2013.

Aguero et al., Inside the Virtual Robotics Challenge: Simulating Real-Time Robotic Disaster Response, 2015, IEEE Transactions on Automation Science and Engineering, vol. 12, No. 2, Apr. 2015, p. 494-506.

Newman et al., A Client/Server Approach to Open-Architecture, Behavior-Based Robot Programming, 2006, 2nd IEEE International Conference on Space Mission Challenges for Information Technology (SMC-IT'06)—8 pages.

Paul et al., Design of a robot force/motion server, 1986, IEEE, p. 1878-1883 (Year: 1986).

Urban et al., Fusion of voice, gesture, and human-computer interface controls for remotely operated robot, 2005, IEEE, IEEE, p. 1644-1651 (Year: 2005).

Zheng et al., IAPcIoud: A Cloud Control Platform for Heterogeneous Robots, 2018, IEEE, p. 30577-30591 (Year: 2018).

Non-Final Office Action dated May 19, 2021 re U.S. Appl. No. 16/450,212, filed Jun. 24, 2019.

Corrected Notice of Allowability dated Oct. 20, 2021 re U.S. Appl. No. 16/450,212, filed Jun. 24, 2019.

Aravind et al., "A Control Strategy for an Autonomous Robotic Vacuum Cleaner for Solar Panels", 2014 Texas Instruments India Educators' Conference.

Meiting et al., "Complete Coverage Path Planning of Wall-Cleaning Robot Using Visual sensor", The Eighth International Conference on Electronic Measurement and Instruments, ICEMI'2007.

Zhang et al., "Cleaning Trajectory Evaluation of a Wall Cleaning Robot Based on Synthesis Standards", IMACS Multiconference on "Computational Engineering in Systems Applications" (CESA), Oct. 4-6, 2006, Beijing, China.

Megalingam et al., "Stair Case Cleaning Robot: Design Considerations and a Case Study", International Conference an Communication and Signal Processing, Apr. 6-8, 2016, India.

* cited by examiner

DIGITAL MODEL RECTIFICATION WITH SENSING ROBOT

BACKGROUND

Unmanned vehicles or robots can be deployed in an area to obtain data about an area, e.g., map data and data about objects in the area. However, problems exist with respect to operation of such robots. For example, often a robot can be provided with at best incomplete and/or out-of-date map data of an area, e.g., boundaries or obstacles such as walls, stairs, etc., may have been moved, added, or removed since a map was last updated. Further, objects such as equipment, furniture, etc., may have been added, removed, or moved. Operating a robot to navigate to a suitable location and/or pose to obtain data about an object and/or map data based on such changed, incomplete, and/or inaccurate data presents challenges.

DETAILED DESCRIPTION

Introduction

Figure 1:
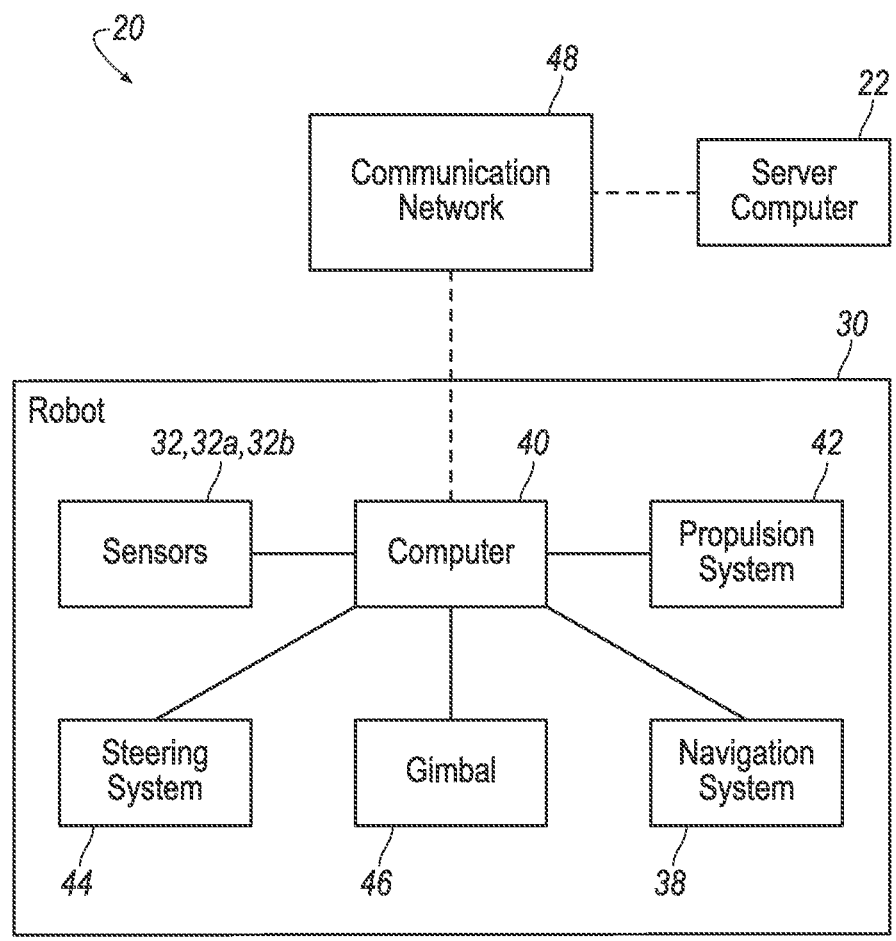
FIG. 1 is a block diagram of components of a system for operating a robot in an area.

A system includes a computer that includes a processor and a memory storing instructions executable by the processor to decompose a stored map of an area into a plurality of polygonal sub-areas. The instructions include instructions to generate a set of target locations in the polygonal sub-areas according to a leaky ball algorithm. The instructions include instructions to actuate a robot to move to a first one of the target locations of the set. The instructions include instructions to actuate a sensor to collect data at the first one of the target locations.

The instructions may further include instructions to decompose the stored map of the area into the plurality of polygonal sub-areas based on locations of objects specified in the stored map.

Each of the target locations may define a data collection area, and the instructions may further include instructions to identify a first data collection area of one of the target locations overlapped by a second data collection area of another of the target locations.

The instructions may further include instructions to remove the target location defining the first data collection area from the set before actuating the robot to move to the first one of the target locations.

The instructions may further include instructions to identify a set of navigable paths based on the stored map, and to actuate the robot to move to the first one of the target locations along one or more of the navigable paths.

The instructions may further include instructions to actuate the sensor to collect data while actuating the robot to move along one or more of the navigable paths.

The stored map may include barriers, and the instructions may further include instructions to identify the set of navigable paths based on the barriers included in the map.

The instructions may further include instructions to select a subset of navigable paths from the set of navigable paths, the subset of paths connecting the target locations.

The instructions may further include instructions to select the subset of navigable paths to minimize a distance along the navigable paths connecting the target locations.

A system includes a computer that includes a processor and a memory storing instructions executable by the processor to identify a set of navigable paths based on a stored map of an area. The instructions include instructions to actuate a robot to move along the navigable paths. The instructions include instructions to actuate a sensor supported by the robot to collect data while actuating the robot to move along one or more of the navigable paths. The instructions include instructions to identify an object specified in a digital model of the area, stored at a remote server, to be along one of the navigable paths. The instructions include instructions to update the object in the digital model based on the collected data.

The navigable paths may define data collection areas, and the instructions may further include instructions to select a subset of navigable paths from the set the navigable paths based on the data collection areas.

The instructions may further include instructions to select the subset of the navigable paths such that the data collection areas overlap the area of the stored map and a distance traveled by the robot is minimized.

A method includes decomposing a stored map of an area into a plurality of polygonal sub-areas. The method includes generating a set of target locations in the polygonal sub-areas according to a leaky ball algorithm. The method includes actuating a robot to move to a first one of the target locations of the set. The method includes actuating a sensor to collect data at the first one of the target locations.

The method may include decomposing the stored map of the area into the plurality of polygonal sub-areas based on locations of objects specified in the stored map.

Each of the target locations may define a data collection area, and the method may include identifying a first data collection area of one of the target locations overlapped by a second data collection area of another of the target locations.

The method may include removing the target location defining the first data collection area from the set before actuating the robot to move to the first one of the target locations.

The method may include identifying a set of navigable paths based on the stored map, and the method may include actuating the robot to move to the first one of the target locations along one or more of the navigable paths.

The method may include actuating the sensor to collect data while actuating the robot to move along one or more of the navigable paths.

The stored map may include barriers, and the i method may include identifying the set of navigable paths based on the barriers included in the map.

The method may include selecting a subset of navigable paths from the set of navigable paths, the subset of paths connecting the target locations.

Figure 2:
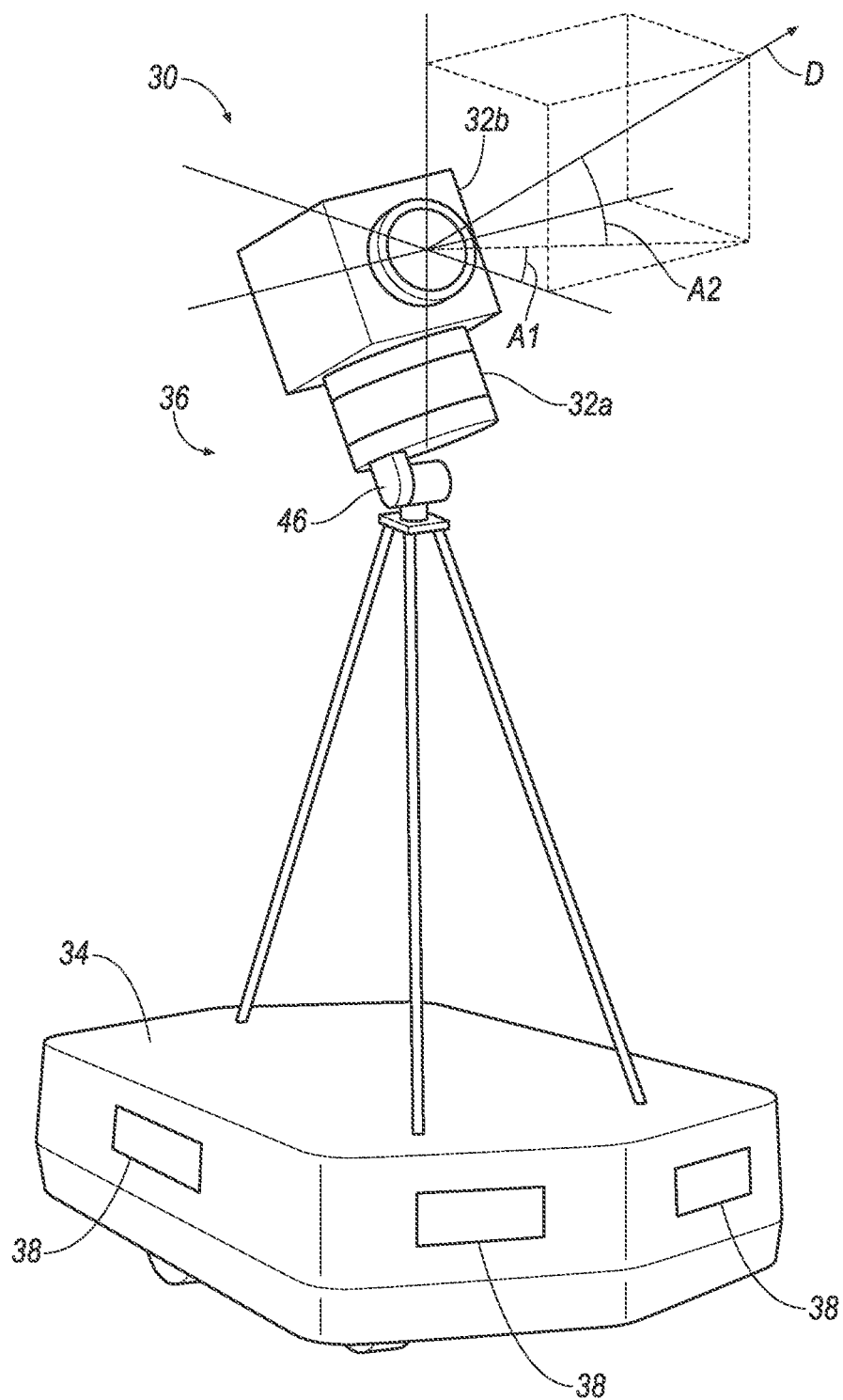
FIG. 2 is a perspective view of an example robot of the system of FIG. 1.
Figure 3:
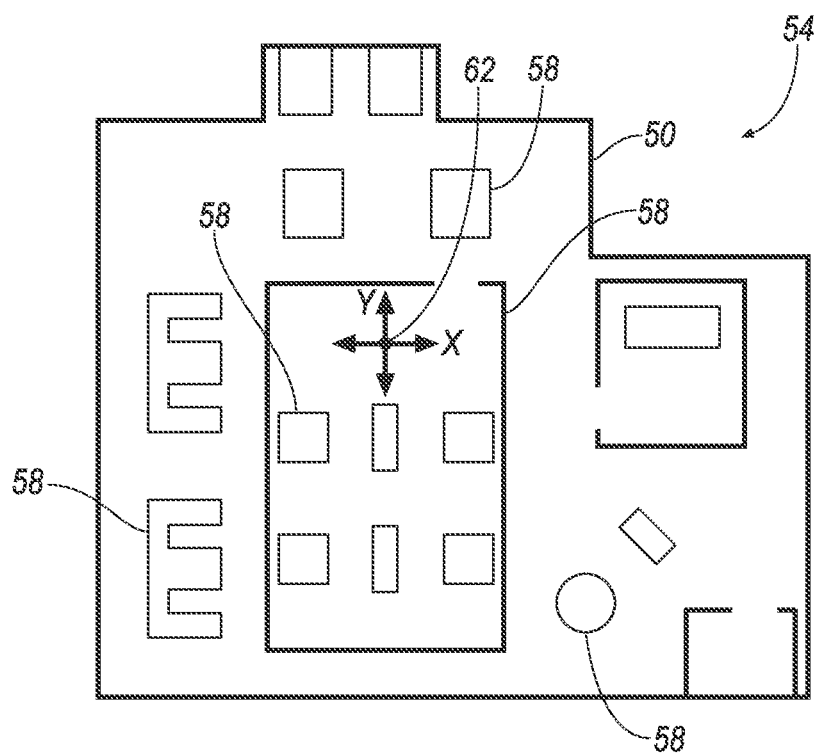
FIG. 3 is an example map of a defined area.
Figure 4:
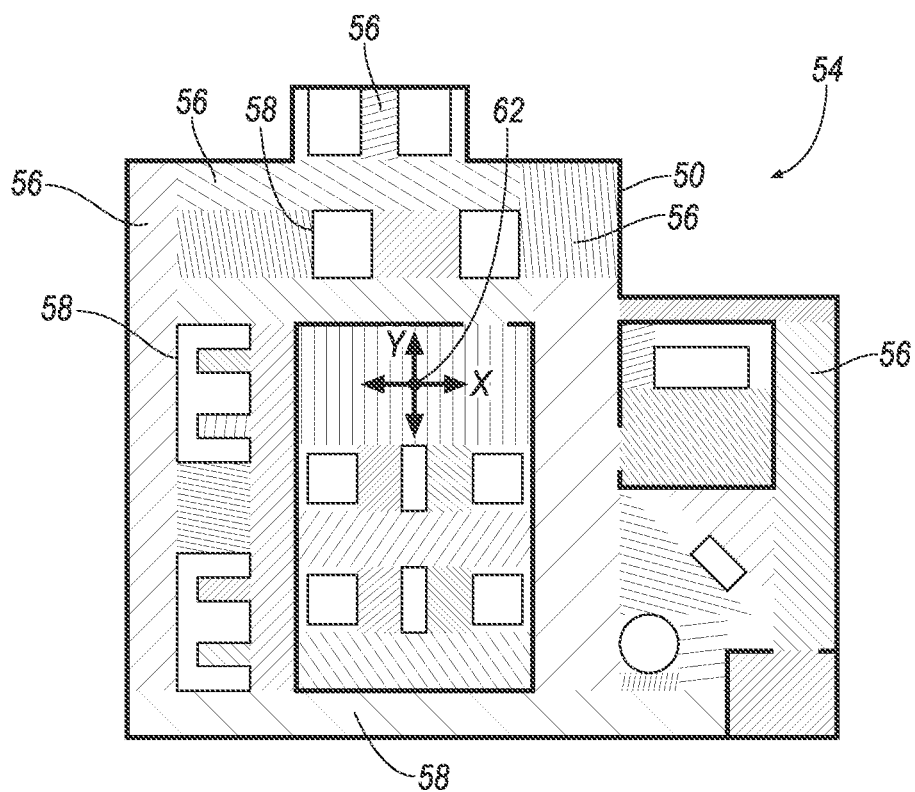
FIG. 4 is an example decomposition of the area into sub-areas.
Figure 5:
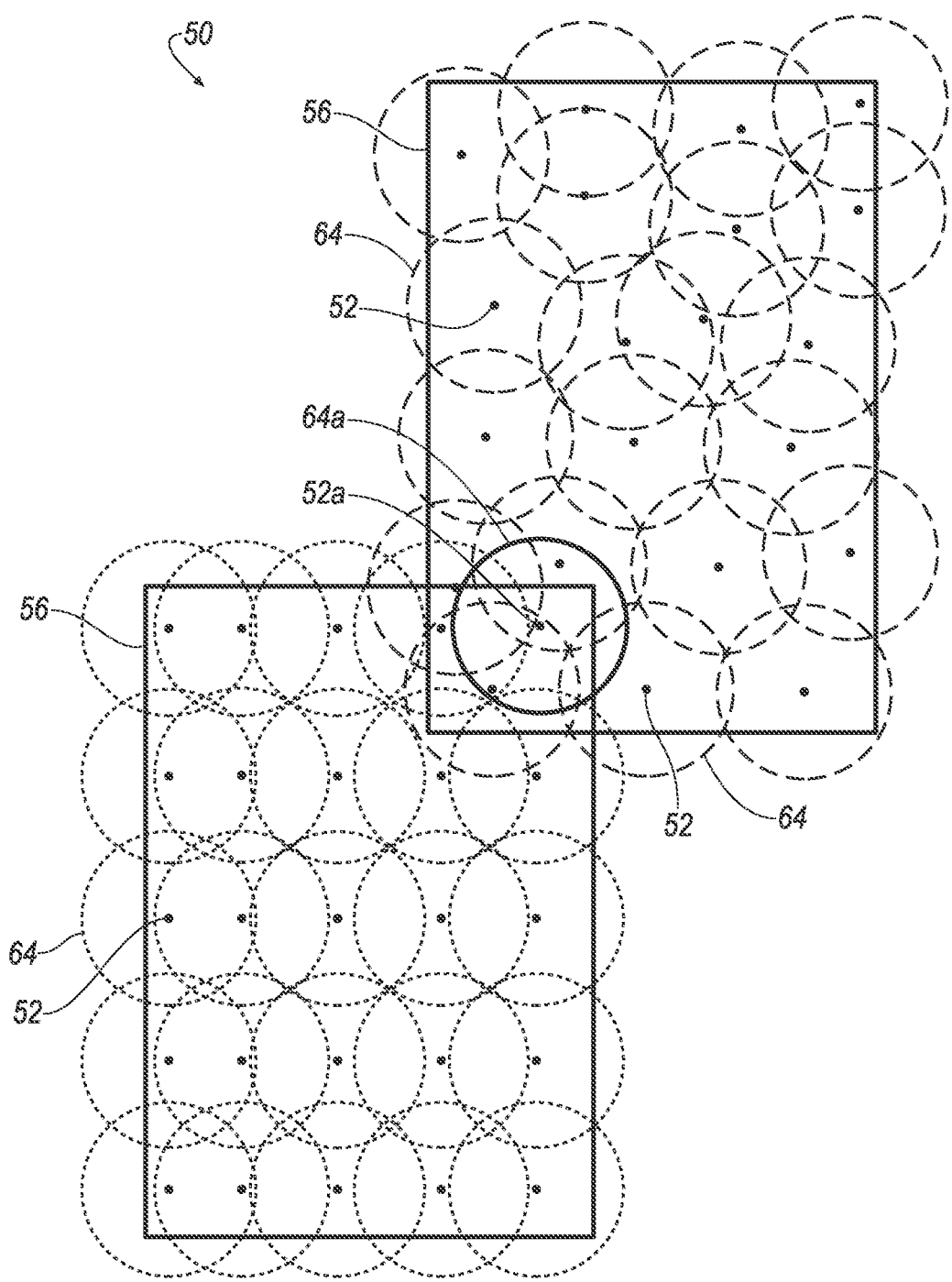
FIG. 5 an illustration of example target locations in two sub-areas including a redundant target location.
Figure 6:
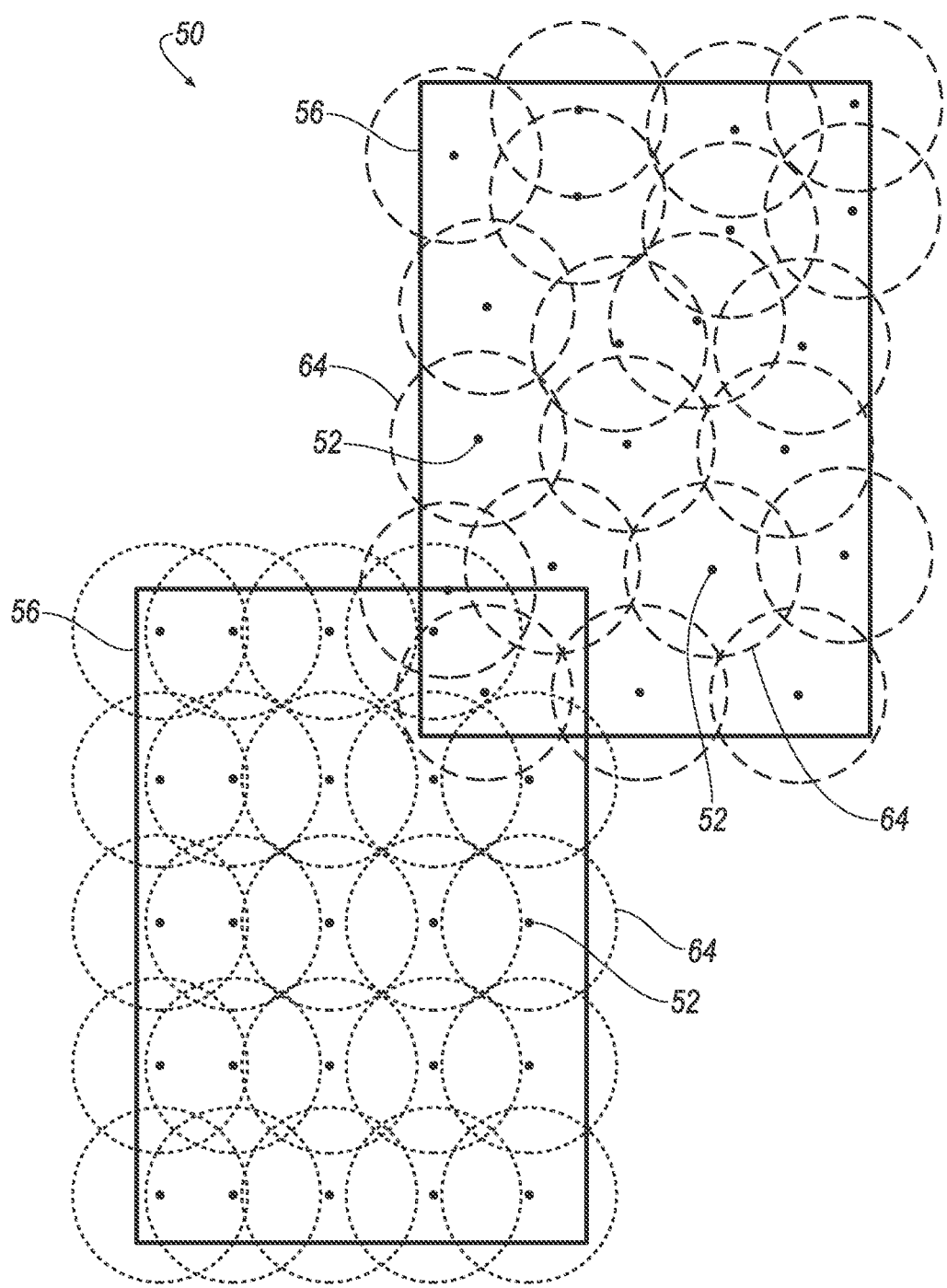
FIG. 6 an illustration of the example target locations in the sub-areas without the redundant target location.
Figure 7:
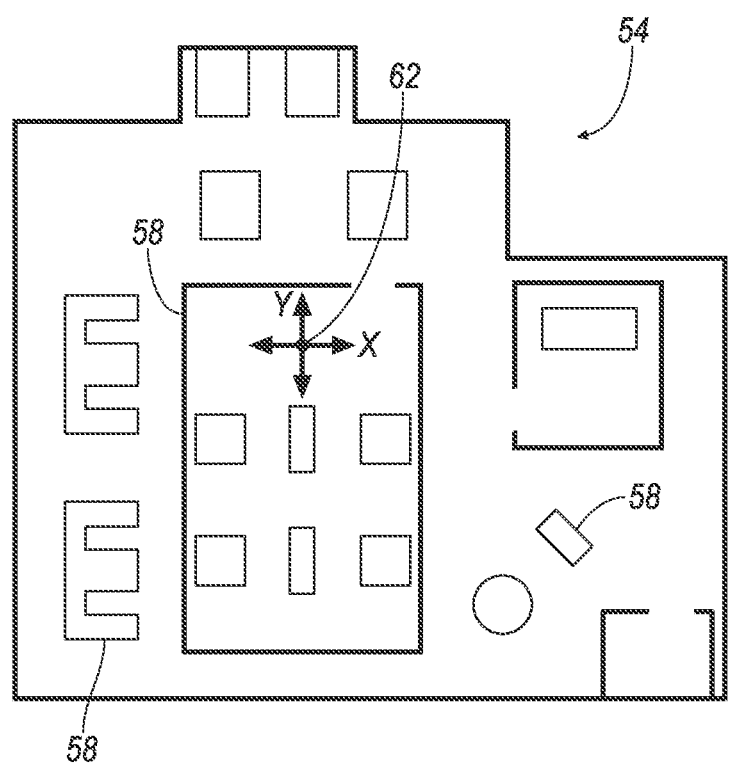
FIG. 7 is an example map of a defined area of the area.

With reference to FIGS. 1 and 2, wherein like numerals indicate like parts throughout the several views a system 20 for recording changes in a layout of an area 50 includes a computer 22 that includes a processor and a memory storing instructions executable by the processor to decompose a stored map 54 of the area 50 into a plurality of polygonal sub-areas 56 (shown in FIGS. 4-6). The instructions include instructions to generate a set of target locations 52 in the polygonal sub-areas 56 according to a leaky ball algorithm. The instructions include instructions to actuate a robot 30 to move to a first one of the target locations 52 of the set. The instructions include instructions to actuate a sensor 32 to collect data at the first one of the target locations 52.

The map 54, shown in FIGS. 3-4 and 7-9, specifies a layout of a defined area 50. The layout is a specification of boundaries of the area 50 as well as of physical features that define the area 50, such as walls, barriers, steps, ramps, etc., i.e., a layout specifies, in addition to area 50 boundaries, typically further specifies locations 52 and orientations of objects and other physical features of the area 50. The defined area 50 may be an area, such as a manufacturing facility, an assembly facility, a storage facility, an office facility, etc. The map 54 may include data that specifies barriers 58, i.e., objects or other physical features (such as walls, stairs, ramps, equipment, etc.) that inhibit movement within the area 50. In other words, the specified barriers 58 restrict movement from one side of the barrier 58 to the other, e.g., the robot 30 cannot navigate through a wall. The data may specify coordinates of the barriers 58, X-Y coordinates relative to specified X-Y axes having a specified origin. The X-Y coordinates may be relative to a positioning system (such as GPS), relative to a certain barrier (such as a structural support wall or pillar in the area 50), relative to edges or a center of the area 50, or relative to any other suitable datum or data for defining locations of barriers 58 in the map 54. The data of the map 54 may be based on blueprints and other technical documents of the defined area 50, a survey of the defined area 50, a previously stored digital model of the defined area 50, or other information suitable for specifying the layout of the defined area 50.

A digital model is a set of electronic data, i.e., that can be stored in a computer memory, that describes objects and other physical features. A digital model of an area 50 includes data that that specifies a layout of the defined area 50. The digital model may include data specifying coordinates (e.g., X-Y coordinates as described for the map 54) of barriers 58 and other objects in the defined area 50. For example, the objects may include walls, doorways, rooms, corridors, machines, desks, cubical barriers, storage areas, stock, assembly and dunnage transfer systems, etc. The digital model may include data specifying shapes of the objects. The shapes may be three-dimensional (3-D), e.g., the data may specify heights, widths, and depths of surfaces of the objects. The digital model may include data specifying orientations of the objects. The orientations of the objects are rotational orientations of the objects, e.g., facing directions of specified surfaces of the objects relative to X-Y axes. The digital model may include computer-aided-design (CAD) data and/or mesh data. CAD data is data used by a CAD computer program to specify the layout of the defined area 50 and the location, shape, and orientation of objects in the defined area 50. Example CAD computer programs include AutoCAD by Autodesk and MPDS4 by CAD Schroder. Mesh data is data that specifies a collection of vertices, edges, and faces that define a shape of an object. The faces may be triangles, quadrilaterals, or other convex polygons.

The target location 52 is a location that specifies coordinates from which the sensor 32 may collect information and generate data specifying one or more objects in the area 50. The target location 52 may be determined by the server computer 22, as described below.

Robot

The robot 30 can autonomously navigate the area 50 and collect data via the sensors 32 for updating the digital model. Autonomous navigation is navigation of the robot 30, e.g., to move to a specified location 52 and/or along a specified path 60, without human input. The robot 30 includes a base 34 that supports other components, such as the sensors 32 (e.g., via a data collector assembly 36), navigation sensors 38, a robot computer 40, and a propulsion system 42. The base 34 may be metal, plastic, or any suitable material having sufficient strength for supporting the components, including a combination of various materials.

The propulsion system 42 transforms stored energy into motion of the robot 30. The proposition system 20 includes an energy storage device, such as a battery or a capacitor. The propulsion system 42 includes one or more motors, e.g., electric motors that transform electrical energy into mechanical energy, i.e., torque. The propulsion system 42 includes wheels operatively coupled to the motor(s) such that torque from the motor(s) is transferred to the wheels. Different wheels may be operatively coupled to different motors, e.g., such that the motors may cause the wheels to spin in opposite directions to change a direction of the robot 30. The proposition system 20 may move the robot 30 in response to a command from the robot computer 40.

The robot 30 may include a steering system 44 that controls a steering angle of one or more wheels of the robot 30. The steering system 44 includes a servo motor and steering linkage, or other suitable structure for controlling the steering angle of the wheels in response to a command from the robot computer 40.

The navigation sensors 38 provide data specifying a location and/or proximity of the robot 30, e.g., relative to the X-Y coordinates of the map 54, other coordinate systems (such as GPS when the coordinates of the map 54 are based on a local system), and/or detected physical objects. The navigation sensors 38 may be global positioning system (GPS) sensors; accelerometers such as piezo-electric or microelectromechanical systems (MEMS) sensors; gyroscopes such as rate, ring laser, or fiber-optic gyroscopes; inertial measurements units (IMU); magnetometers; radar sensors; scanning laser range finders; light detection and ranging (LIDAR) devices; sonar sensors; and/or image processing sensors 32 such as cameras.

The robot 30 includes the data collector assembly 36 for collecting data specifying parameters of detected objects. The data collector assembly 36 includes one or more sensors 32. The data collector is supported by the robot 30, e.g., fixed to the base 34 of the robot 30. The data collector may include one or more legs that support the sensors 32, e.g., above the base 34 by a certain amount. A bottom end of the legs may be fixed to the base 34, and the sensors 32 may be supported at a top end of the legs opposite the bottom end.

The data collector assembly 36 may include a gimbal 46 for controlling a facing direction D of one or more of the sensors 32 (such as a camera 32b), i.e., a direction in which the sensor 32 gathers information and generates data from. The gimbal 46 may pivot the sensors 32 to change an azimuth angle A1 and/or an altitude angle A2 of the facing direction D of the sensor 32 relative to the base 34 (shown in FIG. 2). For example, a first portion of the gimbal 46 may be fixed to the legs(s) and a second portion of the gimbal 46 may be fixed to the sensors 32. The first portion and the second portion may be connected to each other via one or more hinges, rotator plates, pins, bushings, bearings, and/or other suitable structure for providing relative rotation. The gimbal 46 may include one or more motors, gears, servos, or other suitable structure for controlling the azimuth angle A1 and/or the altitude angle A2 of the facing direction D of the sensor 32, e.g., in response to a command from the robot computer 40.

The sensors 32 detect the external world by collecting information and generating data specifying parameters of objects detected by the sensors 32. For example, the data may specify a location of a detected object relative to the sensor 32 and/or robot 30, e.g., a distance from the sensor 32 to the object, an azimuth angle A1 of the object relative to a specified direction (e.g., forward), an altitude angle A2 of the object relative to a specified direction (e.g., parallel with the base 34 and/or relative to the altitude angle A2 of the facing direction D of the sensor 32). As another example, the data may specify a shape of the detected object. The shape may be three-dimensional (3-D), e.g., the data may specify a height, width, and depth of a surface of the detected object.

One or more of the sensors 32 may be a light detection and ranging (LIDAR) lidar sensor 32a that measures distances to detected objects by illuminating the object with pulsed laser light and measuring return times of reflected pulses. Differences in return times and wavelengths of reflected pulses can then be used to generate data specifying a 3-D shape of the object.

One or more of the sensors 32 may be a camera 32b that generates data specifying an image detected by the camera 32b. The data may specify a plurality of pixels arranged in a grid, e.g., defining an X-Y coordinate system. The data may specify a color, brightness, hue, etc., of each pixel. A pair of cameras may be used, e.g., to enable bi-cameral image analysis (also known as stereoscopic image analysis) to determine the proximity of an object in the images, i.e., a distance from the pair of cameras to the object.

The robot computer 40 is a microprocessor-based controller implemented via circuits, chips, or other electronic components. For example, the robot computer 40 includes a processor, memory, etc. The memory of the robot computer 40 may include memory for storing instructions executable by the processor as well as for electronically storing data and/or databases. The robot computer 40 can be in electronic communication with the navigation sensors 38, the propulsion system 42, the server computer 22, and the data collector, e.g., via wired and/or wireless mechanisms such as a communication network 48 or other suitable mechanism for transmitting and receiving data and commands. Although one robot computer 40 is shown in FIG. 1 for ease of illustration, it is to be understood that the robot computer 40 could include, and various operations described herein could be carried out by, one or more computing devices.

The robot computer 40 is programmed to, i.e., the memory may store instructions executable by the processor to, navigate the robot 30. The computer may navigate the robot 30 by transmitting commands to the proposition system 20. The commands may specify actuation of one or more of the motors, e.g., the commands may specific a direction of rotation, a magnitude of torque, and/or a speed of rotation for each motor. For example, the commands may specify actuation of the motors such that wheels of the robot 30 spin in a same direction and a same speed, causing the robot 30 to move in a straight line. As another example, the commands may specify actuation of the motors such that wheels on a right side and a left side of the robot 30 spin in opposite directions or at different speeds, causing the robot 30 to spin or move along a curved path, respectively. The computer may navigate the robot 30 by transmitting commands to the steering system 44, e.g., specifying a steering angle for the wheels of the robot 30.

The robot computer 40 navigates the robot 30 based on data from the navigation sensors 38. For example, data from the navigation sensors 38 may specify a proximity of the robot 30 to a detected object and the robot computer 40 may command the propulsion system 42 and the steering system 44 based on such data, e.g., to avoid contact with the detected object, to maintain a specified distance from the detected object, etc. As another example, data from the navigation sensors 38 may specify a location 52 of the robot 30 relative to coordinates, e.g., GPS coordinates, coordinates relative to a certain detected object (such as a pillar or other fixed object of the area 50), and coordinates based on triangulation of a plurality of detected signals (such as RF signals transmitted by transmitters of the area 50). The robot computer 40 may transmit commands to the propulsion system 42 and the steering system 44 to move the robot 30 from the from the specified location 52 of the robot 30 to a target location 52 and/or along a specified navigable path 60.

The robot computer 40 may navigate the robot 30 in response to a command from the server computer 22. The command from the server computer 22 may specify one or more target locations 52 and navigable paths 60. The robot computer 40 may navigate the robot 30 to the target locations 52 and along the navigable paths 60.

The robot computer 40 may be programmed to move one or more of the sensors 32 to control the facing direction D of the sensors 32. For example, the robot computer 40 may transmit a command to the gimbal 46, e.g., to motors, servos, etc., of the gimbal 46. The command may specify an azimuth angle A1 and/or an altitude angle A2. The robot computer 40 may move the sensors 32 in response to a command from the server computer 22, e.g., commanding actuation of the robot 30 to a specified pose (described below).

The robot computer 40 may be programmed to actuate the sensors 32. For example, the robot computer 40 may transmit a command to the sensors 32 commanding the sensors 32 to collect information and generate data about objects detected by the sensors 32.

The robot computer 40 may be programmed to transmit data about objects detected by the sensors 32 to the server computer 22, e.g., via the communication network 48. Data about an object (object data) is data that that specifies one or more physical attributes of the object. For example, object data may specify a height, a width, a shape, a surface curvature, a location and/or orientation (e.g., relative to X-Y coordinates and axes), etc., of the object.

Communication Network

The communication network 48 (sometimes referred to as a wide area network because it can include communications between devices that are geographically remote from one another, i.e., not in a same building) includes hardware, for facilitating communication among components of the system 20, e.g., the server computer 22 and the robot computer 40. The communication network 48 may facilitate wired or wireless communication among the components in accordance with a number of communication protocols and mechanisms. For example, the communication network 48 may any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wired and wireless communication networks using Bluetooth, IEEE 802.11, local area networks (LAN) and/or wide area networks (WAN), Ethernet, WiFi, Local Interconnect Network (LIN), and the Internet, for providing data communication services.

Server Computer

The server computer 22 is a computing device that includes hardware, e.g. circuits, chips, antenna, etc., programmed to transmit, receive, and process information, to and from other computing devices. The server computer 22 is remote from the robot 30 and the data collector assembly 36. The server computer 22 may be one or more computers, each generally including at least one processor and at least one memory, implemented as described herein, the memory storing instructions executable by the processor, including instructions for carrying out various processes described herein. The server computer 22 is in communication with the robot computer 40, e.g., via the communication network 48. The server computer 22 stores the map 54 of the defined area 50, e.g., in the memory of the server computer 22. The server computer 22 stores the digital model.

The server computer 22 is programmed to determine a set of target locations 52 in the defined area 50. The target locations 52 are specified according to coordinates, e.g., X-Y coordinates, on the map 54 of the defined area 50. The X-Y coordinates specify positions along X-Y axes of a Cartesian coordinate system 62. An origin of the Cartesian coordinate system 62 may be at an intersection of X, Y axes of the Cartesian coordinate system 62. The origin may be at a center of the area 50 of the map 54, a corner of the area 50 of the map 54, etc.

Each of the target locations 52 may define a data collection area 64 (shown in FIGS. 5 and 6). The data collection area 64 is an area from which data may be obtained by a sensor 32 of the data collector assembly 36 when the robot 30 is at the location 52. The data collection area 64 may be defined by capabilities of the sensors 32. For example, the data collection area 64 may be circular in shape and have a radius defined by a detection range of a 360-degree LIDAR sensor 32a. As another example, the data collection area 64 may be triangular in shape, e.g., having a length defined by a detection range of a camera 32b, and a vertex angle defined by a field-of-view of the camera 32b.

The server computer 22 can be programmed to determine the target locations 52 by first decomposing the stored map 54 of the defined area 50 into a plurality of polygonal sub-areas 56 (shown in FIGS. 4-6). Each sub-area 56 encloses a portion of the defined area 50. The sub-areas 56 may overlap each other. The sub-areas 56 provide smaller, less complex shapes (as compared to the entirety of the defined area 50). The computer 22 may decompose the stored map 54 of the area 50 into the plurality of polygonal sub-areas 56 based on locations 52 of objects, such as barriers 58, specified in the stored map 54. For example, the server computer 22 may use the barriers 58 in the stored map 54 as initial boundaries of a complex polygon and/or other shape, including areas that are not fully enclosed. The server computer 22 may decompose the initial boundaries into a plurality of enclosed convex polygons using known polygonal decomposition algorithms. One or more of the sub-areas 56 may overlap each other. The server computer 22 may use other decomposition techniques, such as Boustrophedon Cellular Decomposition, Trapezoidal decomposition and convex polygonal decomposition.

Next, the server computer 22 may generate the set of target locations 52 in the polygonal sub-areas 56 according to a leaky ball algorithm. The leaky ball algorithm determines the target locations 52 by positioning circles within each of the sub-areas 56. The circles are positioned to cover all (or substantially all) of each of the sub-areas 56. The circles overlap. The circles are positioned such that a minimum number of circles are required to cover the sub-areas 56. Covering the sub-areas 56 with the minimum number of circles is a geometric set cover problem. Covering problems, such as the geometric set cover problem, may be solved using a linear program and an approximation algorithm, such as a greedy algorithm. The server computer 22 may use other techniques to generate the set of target locations 52 in the polygonal sub-areas 56, such as with the use of a Voronoi diagram.

A diameter of the circles used with the leaky ball algorithm is based on data collection capabilities of the sensor 32. In other words, the circles may have a same size and shape as the data collection area 64 defined by the target location 52. For example, the radius of circle may be equal to a detection range of a 360-degree LIDAR sensor 32a. The circles may cover less than all of each of the sub-areas 56, e.g., substantially all. For example, the map 54 and/or digital model may include data specifying portions of the defined area 50 that do not need to be covered and/or the layout of the map 54 may prevent complete coverage.

Determining the target locations 52 of each sub-area 56 reduces computing power required to solve the leaky ball algorithm, e.g., by providing smaller, simpler, polygonal areas to be covered. Once target locations 52 of for each sub-area 56 are generated, they may be combined to provide the set of target locations 52 in the defined area 50.

The server computer 22 may be programmed to eliminate redundant target locations 52a from the set of target locations 52 (compare FIGS. 5 and 6). A redundant target location 52a is a target location 52 that defines a data collection area 64a that is completely overlapped by data collection areas 64 defined by other target locations 52. Redundant target locations 52a may occur from combining the target locations 52 of each of the sub-areas 56, e.g., when the sub-areas 56 overlap. The computer 22 may eliminate redundant target locations 52a by identifying a circle from the results of the leaky ball algorithm that encloses an area that is completely covered by areas enclosed by other circles from the results of the leaky ball algorithm. In other words, the server computer 22 may identify a first data collection area 64a of one of the target locations 52 that is overlapped by second data collection areas 64 of other target locations 52. The server computer 22 may remove the target location 52 defining the first data collection area 64 that was identified as being overlapped from the set of target locations 52 stored in the memory of the server.

The server computer 22 may determine the set of target locations 52 based on input received from a user. For example, a user may provide input to the server computer 22 specifying one or more target locations 52. The server computer 22 may determine the set of target locations 52 based on the map 54 and/or the digital model. For example, the map 54 and/or digital model may include data specifying one or more target locations 52, e.g., target locations 52 previous determined with the leaky ball algorithm, provided via input from a user, etc. The server computer 22 may use other techniques for determining the set of target locations 52.

The server computer 22 may be programmed to determine a pose for the robot 30. A pose is a specified orientation (typically, pitch, roll, and yaw) of the robot 30 and components of the robot 30 to orient the sensor 32 to face a certain direction. For example, a pose may specify an orientation of the base 34 of the robot 30, e.g., relative to the Cartesian coordinate system 62 of the map 54, and may specify an azimuth angle A1 and/or altitude angle A2 for the gimbal 46. The pose enables the robot 30 to orient the sensor 32 to face a certain object. The pose specifies an orientation of the sensor 32 with respect to base 34 of the robot 30, the coordinates of map 54, and/or the coordinates of the digital model. The pose may include data specifying an azimuth angle A1 and an altitude angle A2. The azimuth angle A1 and the altitude angle A2 may be associated with one of the target locations 52, e.g., so that the sensor 32 may face the specified azimuth angle A1 and altitude angle A2 while the robot 30 is at the associated target location 52. The server computer 22 may determine the pose by comparing the coordinates of the target location 52 with the coordinates of the object, e.g., to determine the azimuth angle A1 of a vector extending from the X-Y coordinates of the target location 52 to the X-Y coordinates of the object. The server computer 22 may determine the altitude angle A2 based on a height of the object specified by the digital model and a height of the sensor 32, e.g., specified by data stored in memory of the server computer 22, and based on a distance between the target location 52 and the object according to the X-Y coordinates. The server computer 22 may determine the pose based on input of a user, e.g. specifying an azimuth angle A1, an altitude angle A2, and an associated target location 52. The server computer 22 may use other techniques to determine the pose, such as fusing inertial measurement unit (IMU) data with LIDAR data matching using Kalman Filters (e.g., Particle, Unscented, and/or Extended Kalman Filters).

Figure 8:
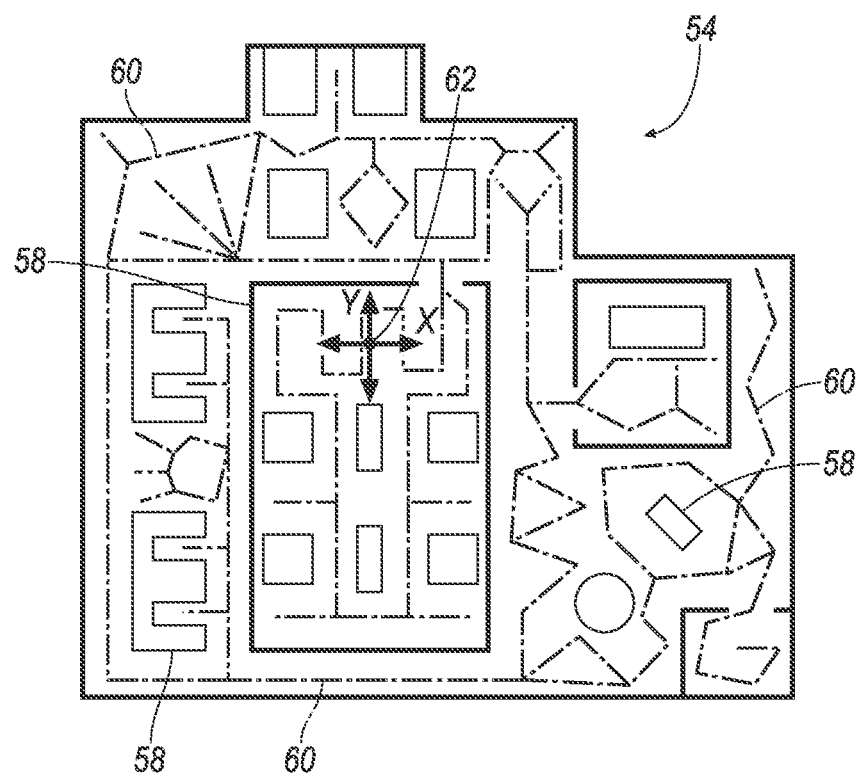
FIG. 8 is an illustration of navigable path of the map.
Figure 9:
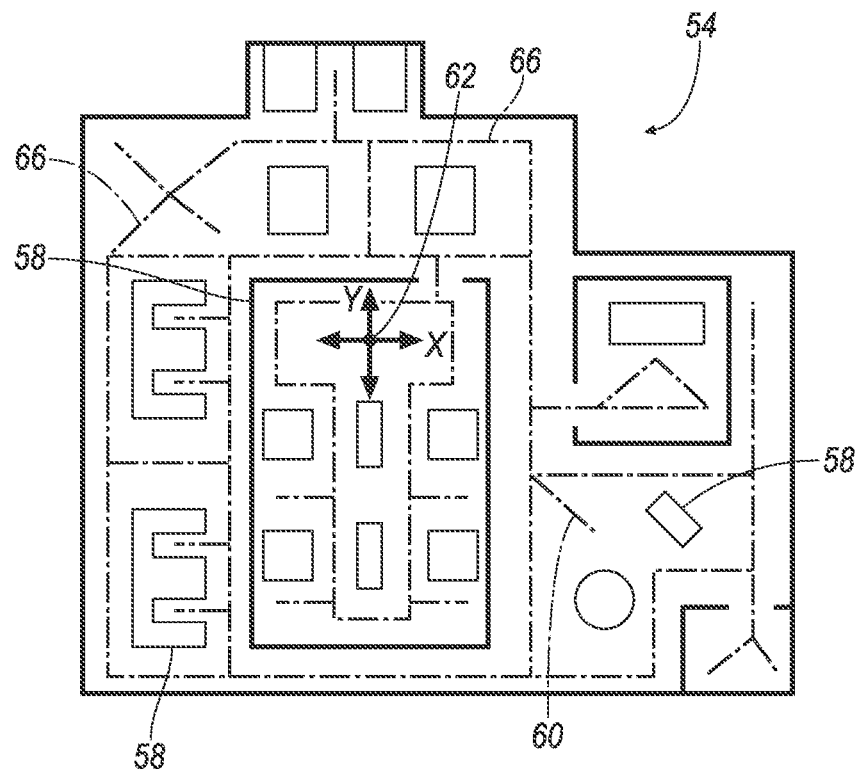
FIG. 9 is an illustration of a subset of the navigable paths.

The server computer 22 is programmed to identify a set of navigable paths 60 based on the stored map 54 (shown in FIGS. 8 and 9). Navigable paths 60 are portions of the defined area 50 navigable by the robot 30. The computer may identify the set of navigable paths 60 based on the barriers 58 included in the map 54. For example, the computer may identify distances between barriers 58 specified in the data of the map 54. The distances may be compared to physical attributes of the robot 30, e.g., a width of the robot 30 and/or a turning radius of the robot 30. The server computer 22 may identify portions of the defined area 50 as navigable paths 60 when the distance between the barriers 58 is sufficient for the robot 30 to navigate therebetween. For example, when the distance between the barriers 58 is greater than the width of the robot 30. As another example, the stored map 54 and/or digital model may include data specifying portions of the defined area 50 as navigable paths 60. The server computer 22 may use other techniques to identify the set of navigable paths 60.

The navigable paths 60 may define data collection areas, i.e., an area from which information may be received by the sensor 32 of the data collector assembly 36 when the robot 30 is navigating along the navigable path 60. The data collection areas 64 may be based on a facing direction D of the sensor 32, capabilities of the sensors 32, e.g., detection ranges, fields of view, etc., of the sensors 32, such as described above for the data collection areas 64 of the target locations 52.

The server computer 22 may be programmed to select a subset 66 of navigable paths 60 from the set of navigable paths 60. For example, compare the navigable paths 60 shown in FIG. 8 with subset 66 of the navigable paths 60 shown in FIG. 9. The subset 66 of paths 60 may connect the target locations 52, e.g., such that the robot 30 may navigate along the subset 66 of paths 60 to navigate to each target location 52. The computer may select the subset 66 of navigable paths 60 to minimize a distance along the navigable paths 60 connecting the target locations 52. For example, the server computer 22 may use an algorithm designed to solve a traveling salesman problem, e.g., as used in known route planning software applications.

The server computer 22 may select a subset 66 of navigable paths 60 from the set the navigable paths 60 based on the data collection areas 64. The server computer 22 may select the subset 66 of the navigable paths 60 such that the data collection areas overlap the area 50 of the stored map 54 and a distance traveled by the robot 30 is minimized. For example, the server computer 22 may identify data collection areas defined by one or more navigable paths 60 that are overlapped by data collection areas of one or more other navigable paths 60. In other words, the server computer 22 may identify redundant data collection areas 64. The server computer 22 may select one of the navigable paths 60 defining the overlapping data collections areas, and refrain from selecting the other, for the subset 66 of the navigable paths 60. Additionally or alternatively, the server computer 22 may consolidate the navigable paths 60 defining the overlapping data collection areas into a single navigable path, e.g., along a median path between the navigable paths 60 defining the overlapping data collection areas 64. The server computer 22 may connect the subset 66 of navigable paths 60, e.g., with an algorithm designed to solve a traveling salesman problem, e.g., as used in known route planning software applications.

The server computer 22 may define the navigable paths 60 and/or subset 66 of navigable paths 60 with data specifying a plurality of way points, vectors, and/or curves, e.g., relative to X-Y coordinates of the map 54. For example, the navigable paths 60 and/or subset 66 of navigable paths 60 may be represented by a polynomial of third degree (sometimes referred to as a "path polynomial") such as $Y=aX+bX^2+cX^3$. Y and X represent X-Y coordinates, e.g., relative to the map 54. Parameters a, b, and c of such a polynomial may determine a path curvature.

The server computer 22 may be programed to actuate the robot 30 to move to one or more of the target locations 52. For example, the server computer 22 may transmit a command to the robot computer 40 specifying the set of target locations 52. The server computer 22 may actuate the robot 30 to move to the target locations 52 along one or more of the navigable paths 60. For example, the server computer 22 may transmit a command to the robot computer 40 specifying a plurality of way points, vectors, and/or curves, e.g., relative to X-Y coordinates of the map 54 and/or digital model.

The server computer 22 may be programmed to actuate the robot 30 to a pose specified to orient the sensor 32 with respect to the object. For example, the server computer 22 may transmit a command to the robot computer 40 specifying an azimuth angle A1 and an altitude angle A2. The command may specify an association between a certain one of the target locations 52, and the azimuth angle A1 and the altitude angle A2, e.g., so that the sensor 32 is actuated to face the specified azimuth angle A1 and altitude angle A2 once the robot 30 is actuated to move to the associated target location 52.

The server computer 22 may be programmed to actuate the sensor 32 on the robot 30 to collect data at the target locations 52. For example, the server computer 22 may transmit a command to the robot computer 40 specifying the actuation of the sensor 32 and specifying one or more of the target locations 52 for such actuation.

The server computer 22 may be programmed to actuate the sensor 32 to collect data while actuating the robot 30 to move along one or more of the navigable paths 60. For example, the server computer 22 may transmit a command to the robot computer 40 specifying actuation of the sensor 32 and specifying one or more of the navigable paths 60 for such actuation.

The server computer 22 may be programmed to identify an object specified in the digital to be at the coordinates for the target location 52. The server computer 22 may identify an object in data generated from information collected by the sensor 32 from the data collection area 64 while the robot 30 is at the target location 52.

The server computer 22 may identify the object specified in the digital model by comparing the data collected at one of the target locations 52 to the data of the digital model specifying the three-dimensional shape of the object. For example, the server computer 22 may compare one or more parameters, e.g., length, width, curvature, etc., specified by the data generated with the LIDAR sensor 32a while the robot 30 is at one of the target locations 52 with one or more parameters specified by the data of the object at the target location 52 in the digital model. The server computer 22 may identify the object in the digital model as the object in the data from the LIDAR sensor 32a when the parameters specified in such data match, or are within a threshold amount of matching, e.g., 95%.

The server computer 22 may identify the object specified in the digital model based on image recognition analysis of data specifying one or more images captured by the camera 32b at one of the target locations 52. The images may be captured while the robot 30 is in a specified pose. For example, the objects may be recognized in the image data using known techniques and methods, and parameters of such objects may be compared to the parameters specified by the data of the object in the digital model.

The server computer 22 may be programmed to identify an object specified in the digital model of the area 50 to be along one of the navigable paths 60. The server computer 22 may identify the object based on compared parameters, image recognition, etc., as described for the object at the target location 52. The server computer 22 may use other techniques to identify the object at the target location 52 and/or along the navigable path 60.

The data specifying the identified objects in the sensor 32 data may not exactly match the data specifying such objects in the digital model. For example, one or more objects may have changed locations and/or orientations since generation of the digital model. In other words, the digital model may not be up-to-date. Identification of the objects in the data from the sensor 32 and in the digital model enable differences, e.g., in location, orientation, etc., between such data to be rectified, e.g., so that the digital data matches the data from the sensor 32.

The server computer 22 is programmed to update the object in the digital model based on the collected data. For example, the server computer 22 may amend the data of the digital model that specifies the object to replicate the data that specifies such object in the data generated by the sensor 32.

The server computer 22 may be programmed to identify one or more additional target locations 52 based on the data collected with the sensor 32, e.g., at one of the target locations 52 and/or along one of the navigable paths 60. The additional location 52 may be outside the defined area 50, i.e., an area not specified in the digital model. For example, the data collected by the sensor 32 may specify a corridor or other area 50 not included in the map 54 and/or digital model and navigable by the robot 30. The server computer 22 may identify a target location 52 at such area.

Processes

Figure 10:
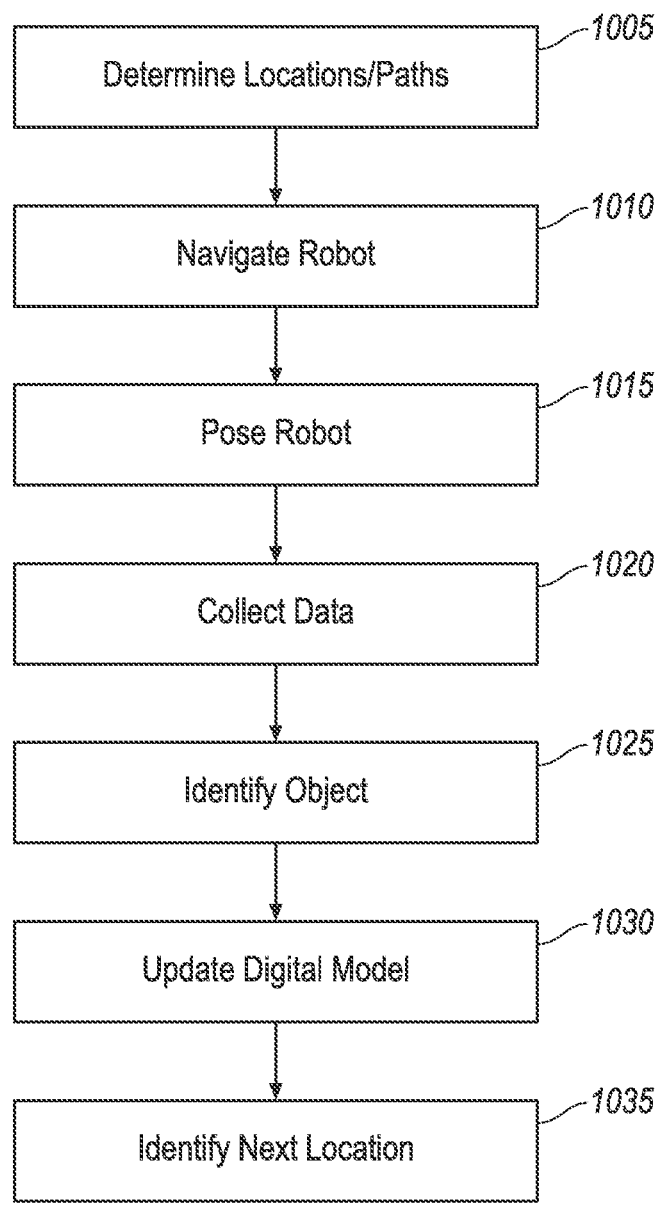
FIG. 10 is an illustration of a flow chart for a process of controlling the system.

FIG. 10 is a process flow diagram illustrating an exemplary process 1000 for operating the system 20. The process 1000 begins in a block 1005 where the server computer 22 determines target locations 52 for collecting data and/or navigable paths 60, e.g., as described herein. The server computer 22 may determine the target locations 52 and/or navigable paths 60 according to a process 1100 (further described below).

At a block 1010, the server computer 22 actuates the robot 30 to navigate to one of the target locations 52 and/or along the navigable paths 60 determined in the block 1005. For example, the server computer 22 may actuate the robot 30 by transmitting a command to the robot 30 specifying target locations 52 and/or navigable paths 60, e.g., as described herein.

At a block 1015, the server computer 22 actuates the robot 30 to a specified pose, e.g., to orient the sensor 32 with respect to an object at the target location 52. The server computer 22 may determine the specified pose as described herein. The server computer 22 may actuate the robot 30 to the pose by transmitting a command to the robot 30, e.g., specifying an azimuth angle A1, an altitude angle A2, and an associated target location 52 (relative to the Cartesian coordinate system 62 of the map 54).

At a block 1020 the server computer 22 actuates one or more of the sensors 32 of the robot 30 to collect data. The server computer 22 may actuate the sensors 32 of the robot 30 by transmitting a command to the robot 30. The server computer 22 actuates one or more of the sensors 32 to collect data when the robot 30 is at the target location 52. The server computer 22 may actuate one or more of the sensors 32 to collect data when the robot 30 is navigating along the navigable path 60. The server computer 22 may actuate one or more of the sensors 32 to collect data when the robot 30 is in the specified pose.

At a block 1025 the server computer 22 identifies an object specified in the digital model, and identifies such object specified in data collected at the block 1020. The server computer 22 may identify such object as described herein.

At a block 1030 the server computer 22 updates the data specifying the object in the digital model to match the data specifying the object collected by the sensors 32, e.g., as described herein.

At a block 1035 the server computer 22 identifies a next target location 52. The server computer 22 may determine the next target location 52 as being outside the defined area 50 and based on the data collected at the block 1020, e.g., as described herein. Alternatively, the server computer 22 may identify the next target location 52 based on the target locations 52 previously determined at the block 1005. After the block 1035 the process 1000 returns to the block 1010 and reiterates the process 1000, e.g., navigating and posing the robot 30, and then collecting data and updating the digital model. The server computer 22 may continue to iterate the process 1000 until data has been collected at all identifiable target locations 52.

Figure 11:
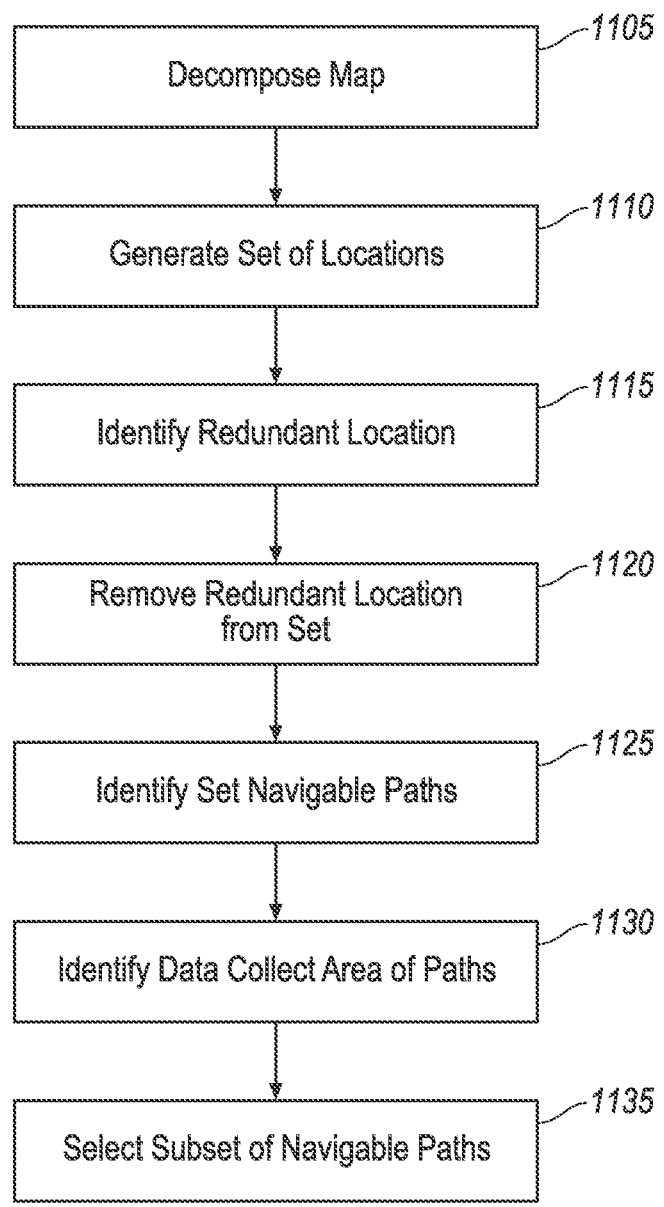
FIG. 11 is an illustration of a flow chart detailing a sub-process of the process of FIG. 10.

FIG. 11 is a process flow diagram illustrating an exemplary process 1100 for determining target locations 52 and navigable paths 60. The process 1100 begins in a block 1105 where the server computer 22 decomposes a stored map 54 of an area 50 into a plurality of polygonal sub-areas 56, e.g., based on data specifying barriers 58 and as described herein.

Next at a block 1110 the server computer 22 generates target locations 52 in each of the sub-areas 56. The server computer 22 generates the target locations 52 in the sub-areas 56 according to a leaky ball algorithm. The server computer 22 consolidates the generated target locations 52 into a set of target locations 52.

Next at a block 1115 the server computer 22 identifies any target locations 52a generated at the block 1105 having a data collection area 64a that is overlapped by data collection areas 64 defined by other target locations 52. In other words, the server computer 22 identifies redundant target locations 52a.

Next at a block 1120 the server computer 22 removes the target locations 52 identified at the block 1115 from the set of target locations 52 generated at the block 1110.

At a block 1125 the server computer 22 identifies a set of navigable paths 60, e.g., based on barriers 58 and other physical objects specified in the map 54 and as described herein.

Next, at a block 1130 the server computer 22 identifies data collection areas of the set of navigable paths 60 identified at the block 1125. The data collection areas are defined by capabilities of the sensors 32 and as described herein.

Finally, at a block 1135 the server computer 22 selects a subset 66 of navigable paths 60 from the navigable paths 60 identified at the block 1125. The server computer 22 may select the subset 66 to minimize a distance along the navigable paths 60 connecting the target locations 52, such that the data collection areas overlap the area 50 of the stored map 54 and a distance traveled by the robot 30 is minimized, etc., as described herein.

CONCLUSION

With regard to the processes 1000, 1100 described herein, it should be understood that, although the steps of such processes 1000, 1100 have been described as occurring according to a certain ordered sequence, such processes 1000, 1100 could be practiced with the described steps performed in an order other than the order described herein. It further should be understood that certain steps could be performed simultaneously, that other steps could be added, or that certain steps described herein could be omitted. In other words, the description of the process 300 herein is provided for the purpose of illustrating certain embodiments and should in no way be construed so as to limit the disclosed subject matter.

Computing devices, such as the computer of the robot, the computer of the data collector assembly, and the server computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising a computer that includes a processor and a memory storing instructions executable by the processor to:
decompose a stored map of an area into a plurality of polygonal sub-areas;
generate a set of target locations in the polygonal sub-areas according to an algorithm, each of the target locations of the set defining a circular data collection area that has a diameter based on data collection capabilities of a sensor supported by a robot, the algorithm determines the set of target locations by positioning the circular data collection areas within each of the polygonal sub-areas;
identify a first circular data collection area of one of the target locations of the set of target locations that is overlapped by a second circular data collection area of another of the target locations;
remove the target location defining the first circular data collection area from the set of target locations;
actuate the robot to move to a first one of the target locations of the set;
actuate the sensor supported by the robot to collect data at the first one of the target locations;
actuate the robot to move to a second one of the target locations; and
actuate the sensor supported by the robot to collect data at the second one of the target locations.

2. The system of claim 1, wherein the instructions further include instructions to decompose the stored map of the area into the plurality of polygonal sub-areas based on locations of objects specified in the stored map.

3. The system of claim 1, wherein the instructions further include instructions to identify a set of navigable paths based on the stored map, and to actuate the robot to move to the first one of the target locations along one or more of the navigable paths.

4. The system of claim 3, wherein the instructions further include instructions to actuate the sensor to collect data while actuating the robot to move along one or more of the navigable paths.

5. The system of claim 3, wherein the stored map includes barriers, and the instructions include instructions to identify the set of navigable paths based on the barriers included in the map.

6. The system of claim 3, wherein the instructions include instructions to select a subset of navigable paths from the set of navigable paths, the subset of paths connecting the target locations.

7. The system of claim 1, wherein the memory stores a digital model of the area, the digital model specifying objects and positions of the objects in the area, and wherein the instructions stored by the memory include instructions to identify, in the data collected by the sensor at one of the target locations, one of the objects specified in the digital model of the area based on a comparison of parameters of the objects in the digital model with parameters of the data collected by the sensor at one of the target locations and to update the position of the identified object in the digital model based on the collected data.

8. A system, comprising:
a robot;
a sensor supported by the robot; and
a computer remote from the robot, the computer including a processor and a memory;
the memory storing a digital model of an area, the digital model specifying objects and positions of the objects in the area; and
the memory storing instructions executable by the processor to:
identify a set of navigable paths based on a stored map of the area, the navigable paths defining data collection areas from which data is collectable by the sensor when the robot is navigating along the navigable path;
select a subset of navigable paths from the set of the navigable paths based on the data collection areas, the subset of navigable paths selected in part by first identifying a first navigable path and a second navigable path having overlapping data collection areas and then selecting one of the first navigable path or the second navigable path for the subset of navigable paths and refraining from selecting the other of the first navigable path or the second navigable path of the subset of navigable path;
actuate the robot to move along the navigable paths;
actuate the sensor supported by the robot to collect data while actuating the robot to move along one or more of the navigable paths;
identify, in the data collected while actuating the robot to move along one or more of the navigable paths, one of the objects specified in the digital model of the area based on a comparison of parameters of the objects in the digital model with parameters of the data collected while actuating the robot to move along one or more of the navigable paths; and
update the position of the identified object in the digital model based on the collected data.

9. The system of claim 8, wherein the instructions include instructions to select the subset of the navigable paths such that the data collection areas overlap the area of the stored map and a distance traveled by the robot is minimized.

10. A method, comprising:
decomposing a stored map of an area into a plurality of polygonal sub-areas;
generating a set of target locations in the polygonal sub-areas according to an algorithm, each of the target locations of the set defining a circular data collection area that has a diameter based on data collection capabilities of a sensor supported by a robot, the algorithm determines the set of target locations by positioning the circular data collection areas within each of the polygonal sub-areas;
identifying a first circular data collection area of one of the target locations of the set of target locations that is overlapped by a second circular data collection area of another of the target locations;
removing the target location defining the first circular data collection area from the set of target locations;
actuating the robot to move to a first one of the target locations of the set;
actuating the sensor supported by the robot to collect data at the first one of the target locations;
actuating the robot to move to a second one of the target locations; and
actuating the sensor supported by the robot to collect data at the second one of the target locations.

11. The method of claim 10, further comprising decomposing the stored map of the area into the plurality of polygonal sub-areas based on locations of objects specified in the stored map.

12. The method of claim 10, further comprising identifying a set of navigable paths based on the stored map, and further comprising actuating the robot to move to the first one of the target locations along one or more of the navigable paths.

13. The method of claim 12, further comprising actuating the sensor to collect data while actuating the robot to move along one or more of the navigable paths.

14. The method of claim 12, wherein the stored map includes barriers, and further comprising identifying the set of navigable paths based on the barriers included in the map.

15. The method of claim 12, further comprising selecting a subset of navigable paths from the set of navigable paths, the subset of paths connecting the target locations.

* * * * *